March 13, 1934.    T. F. MENZE ET AL    1,951,289
WINDOW SCREEN
Filed Nov. 7, 1932    2 Sheets-Sheet 2
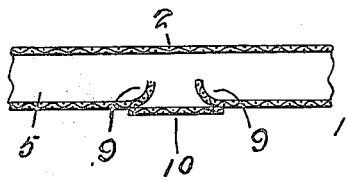
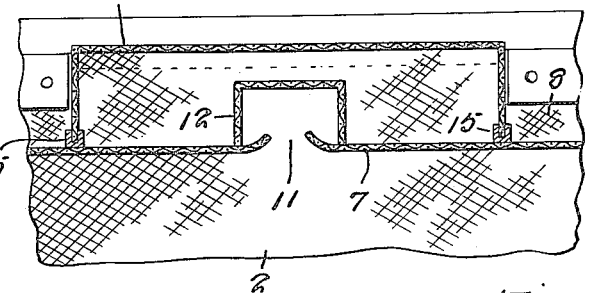
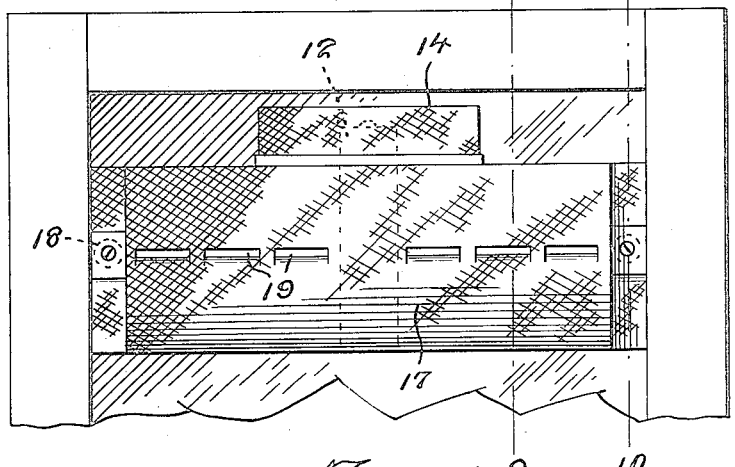
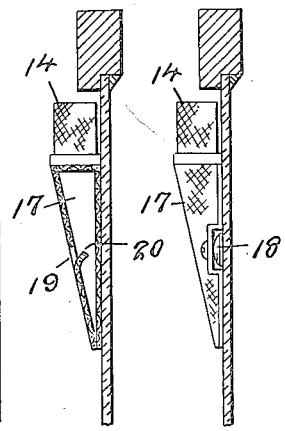
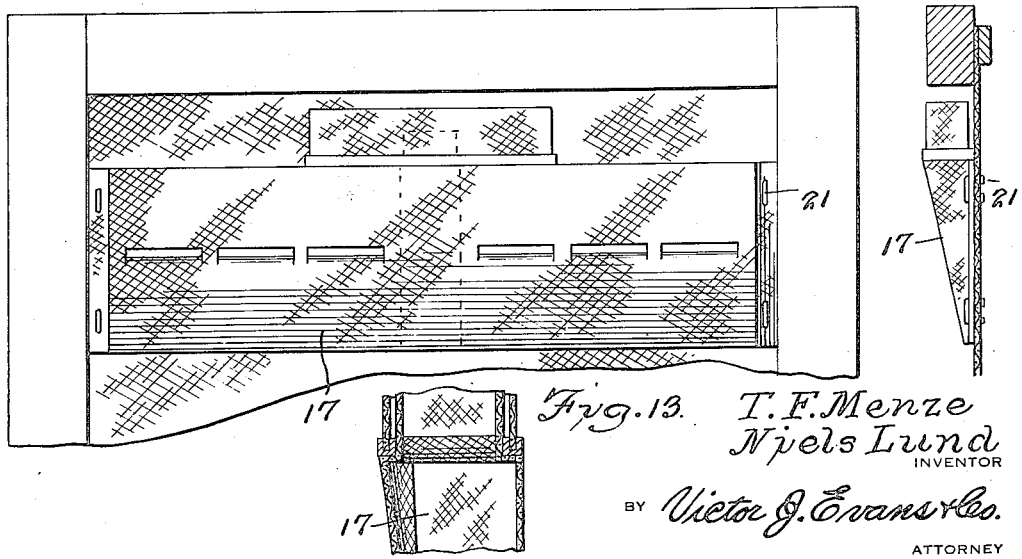

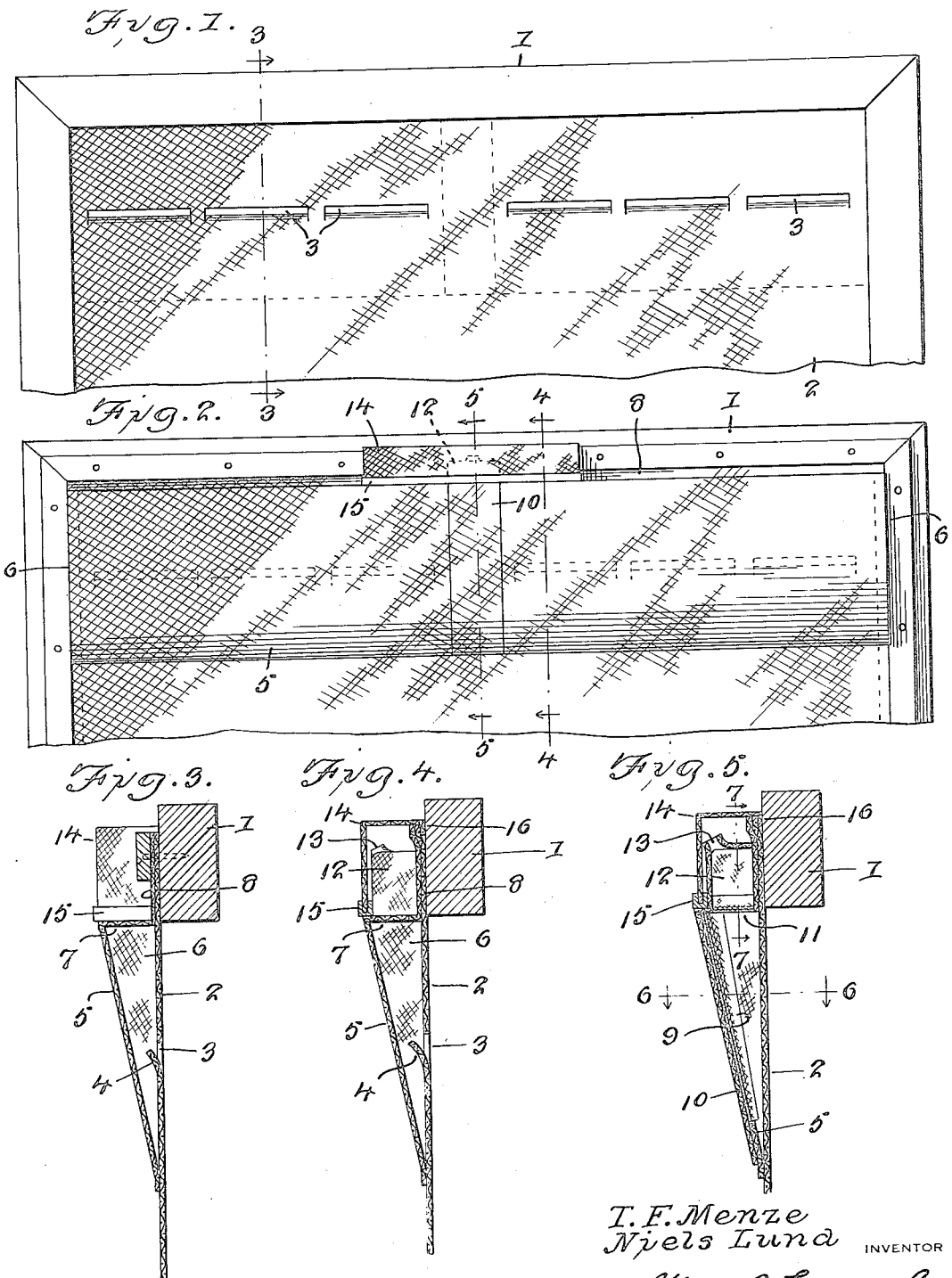

Patented Mar. 13, 1934

1,951,289

UNITED STATES PATENT OFFICE 1,951,289

WINDOW SCREEN

Theodore F. Menze and Niels Lund, Greensboro, N. C.

Application November 7, 1932, Serial No. 641,639

1 Claim. (Cl. 43—119)

This invention relates to fly or insect traps, especially adapted for window or door screens and has for the primary object, the provision of a device of the above stated character which may form an integral part of a screen or an attachment therefor and which is so constructed that flies or similar insects may readily trap themselves when crawling on the screen or endeavoring to escape from a room through the screen, whereby the trapped flies or insects may be readily destroyed when desired.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary plan view illustrating the inner face of a screen showing the entrances to admit flies or other insects to the trap located on the outer face of the screen.

Figure 2 is a fragmentary plan view illustrating the outer face of the screen with the trap applied thereto.

Figure 3 is a sectional view taken on the line 3—3 of Figure 1.

Figure 4 is a sectional view taken on the line 4—4 of Figure 2.

Figure 5 is a sectional view taken on the line 5—5 of Figure 2.

Figure 6 is a sectional view taken on the line 6—6 of Figure 5.

Figure 7 is a sectional view taken on the line 7—7 of Figure 5.

Figure 8 is a fragmentary plan view illustrating a modified form of our invention, wherein the trap is in the form of an attachment to the window.

Figure 9 is a sectional view taken on the line 9—9 of Figure 8.

Figure 10 is a sectional view taken on the line 10—10 of Figure 8.

Figure 11 is a fragmentary plan view illustrating a modified form of means for attaching the trap to the screen.

Figure 12 is a fragmentary edge view illustrating the same.

Figure 13 is a fragmentary sectional view illustrating the means of mounting the removable cage on the trap.

Referring in detail to the drawings, the numeral 1 indicates the frame of a screen carrying the usual foraminous material 2 provided adjacent the upper edge of the screen with a series of entrances 3. The entrances are of elongated formation as shown in Figure 1 and are formed by cutting or striking out portions of the foraminous material which also form guards 4 at the entrances to retard the movement of the flies or insects from passing back through the entrances after once entering the latter. Chambers 5 are located on the screen and upon the outer face thereof so that the flies after passing through the entrances 3 may collect within the chambers. One wall of the chamber is formed by the foraminous material 2 of the screen. The other walls of the chamber are formed from a single piece of foraminous material bent to form an outer wall 5, end wall 6, a top wall 7 and an attaching wall 8, the latter-named wall being secured to the frame 1 by the fasteners employed for connecting the foraminous material 2 to the frame 1. The edges of the walls 5 and 6 are secured to the foraminous material 2 by solder or the like. The outer wall 5 from the top wall 7 converges toward the foraminous material 2 so that the chamber formed thereby tapers towards its lower edge, causing the flies when in said chamber to crawl upwardly and across both the outer wall 5 and the top wall 7. The walls 5 and 7 being of foraminous material and next to the light will cause the flies or insects to remain on said walls during their crawling or movement.

The outer wall 5 is cut or severed and turned inwardly to form vertically arranged guide flanges 9. A strip of foraminous material 10 overlies the severed portion of the outer wall 5 and is suitably secured thereto for the purpose of closing the severed portion of the outer wall and cooperates with the guide flanges 9 in forming a vertical passage, the upper end leading to an opening 11 formed in the top wall 7. A compartment 12 of foraminous material is carried by the top wall about the opening 11 and is provided in its upper wall with an outlet opening 13, the walls of the compartment being flared outwardly to form the outlet opening 13 to guide flies or other insects in the compartment outwardly therefrom into a cage 14. The cage 14 surrounds the compartment in which the flies or insects are finally trapped. The cage about its lower edge is provided with a binding strip 15 which rests on the top wall 7 of the chamber and the cage is further secured in place by having a flange 16 received within an offset portion in the foraminous material 2 and the upper rail of the frame 1.

The construction of trap heretofore described forms an integral part of the screen except for the cage 14 which is removable from the screen when desiring to destroy the flies or other insects caught therein.

Referring to the form of invention disclosed in Figures 8 to 10, the trap is constructed as a single unit to be attached to any type of window upon the inner face thereof and consists of a chamber 17 removably secured to the window by fasteners 18. The chamber 17 is shaped similarly to the chamber 5 and its outer wall is provided with entrances 19 partially overlain by guards 20. The top wall of the chamber 17 carries the compartment 12 and cage 14 as clearly shown in the drawings. Instead of employing the fasteners 18 as shown in Figure 10, the chamber 17 may be secured to the foraminous material of the screen by clinched staples 21.

We claim:

In combination with a screen having a strip of foraminous material provided with portions struck out therefrom to form entrances with guards partially overlying said entrances, a strip of foraminous material bent to form outer top and side walls and an attaching portion engaging the foraminous material of the screen to form a chamber with the entrances communicative therewith, means securing the strip of foraminous material to the screen, said top wall having an opening, a compartment of foraminous material formed integrally with the top wall and surrounding the opening and provided with an exit, a cage of foraminous material enclosing the compartment and resting on the top wall, said outer wall having a severed portion with the material thereof bent inwardly to form spaced guide flanges leading towards the opening in the top wall, and a strip of foraminous material closing the severed portion of the outer wall.

THEODORE F. MENZE.
NIELS LUND.